United States Patent
McCalmont

(10) Patent No.: US 8,656,807 B2
(45) Date of Patent: Feb. 25, 2014

(54) DAMPED ROTARY ENCODER

(75) Inventor: Paul Ernest McCalmont, Cincinnati, OH (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 674 days.

(21) Appl. No.: 12/836,621

(22) Filed: Jul. 15, 2010

(65) Prior Publication Data

US 2011/0011199 A1    Jan. 20, 2011

Related U.S. Application Data

(60) Provisional application No. 61/225,784, filed on Jul. 15, 2009.

(51) Int. Cl.
| | |
|---|---|
| *F16F 15/315* | (2006.01) |
| *F16F 15/14* | (2006.01) |
| *G01D 11/10* | (2006.01) |
| *G01P 1/00* | (2006.01) |
| *G01P 3/44* | (2006.01) |

(52) U.S. Cl.
CPC .................. *F16F 15/1442* (2013.01); *G01D 11/10* (2013.01); *G01P 1/003* (2013.01); *G01P 3/44* (2013.01)
USPC .......................... 74/574.4; 464/71

(58) Field of Classification Search
USPC ............ 74/574.4; 409/141; 399/167; 464/71; 416/145
IPC ....................................................... F16F 15/315
See application file for complete search history.

(56) References Cited

U.S. PATENT DOCUMENTS

| | | | | |
|---|---|---|---|---|
| 1,701,518 | A | * | 2/1929 | Walker .......................... 74/574.4 |
| 2,714,823 | A | | 8/1955 | Dall et al. |
| 2,859,637 | A | * | 11/1958 | Hagenlocher ................ 74/574.4 |
| 3,447,402 | A | | 6/1969 | Ray |
| 3,522,864 | A | | 8/1970 | Richter |
| 3,790,153 | A | | 2/1974 | Seidenfaden |
| 3,861,828 | A | * | 1/1975 | Biermann et al. ............. 416/145 |
| 3,868,833 | A | * | 3/1975 | Noe et al. ......................... 464/71 |
| 3,995,513 | A | * | 12/1976 | Amdall et al. ................ 74/574.4 |
| 4,438,599 | A | | 3/1984 | Kamman et al. |
| 4,468,019 | A | | 8/1984 | Staudenmaier |
| 4,512,068 | A | | 4/1985 | Piotrowski |

(Continued)

FOREIGN PATENT DOCUMENTS

JP    10-174328 A    *    6/1998    ............ F16F 15/315

OTHER PUBLICATIONS

English Abstract of JP 10-174328 A, Hiroshi, Jun. 1998.*

*Primary Examiner* — Vinh Luong
(74) *Attorney, Agent, or Firm* — Reising Ethington P.C.

(57) ABSTRACT

A tuned damper for the input shaft on a rotary encoder includes a mounting plate and a mass plate having a plurality of mounting flanges each having mounting apertures. Fastening elements couple the mass plate to the mounting plate, and resilient elements or donuts each having a central aperture are positioned on either side of each mounting flange. The diameter of the fastening elements is smaller than the diameter of the mounting apertures and the holes in the resilient donuts so that the fastening elements do not touch the body of either the resilient elements or the mounting flange and the mass plate does not directly contact the mounting plate in order to isolate the mass plate from the mounting plate. The mass plate dampens torsional vibration which may exist in the input shaft of the encoder.

3 Claims, 2 Drawing Sheets

(56) References Cited

U.S. PATENT DOCUMENTS

| | | |
|---|---|---|
| 4,630,811 A | 12/1986 | Rudisill |
| 4,669,227 A | 6/1987 | Treppner |
| 4,921,378 A | 5/1990 | Kytola |
| 5,033,340 A | 7/1991 | Siefring |
| 5,058,261 A | 10/1991 | Kitamura |
| 5,871,315 A | 2/1999 | Burt et al. |
| 5,931,051 A * | 8/1999 | Ott ............................... 74/574.4 |
| 6,456,807 B1 * | 9/2002 | Makino et al. ................ 399/167 |
| 6,719,503 B1 * | 4/2004 | McCalmont et al. ......... 409/141 |
| 7,690,872 B2 * | 4/2010 | Hashimoto et al. ........... 409/141 |

* cited by examiner

DAMPED ROTARY ENCODER

FIELD

A damper device is used to prevent a rotary encoder from losing its position as a result of resonant vibrations.

BACKGROUND

A tuned damped absorber arrangement is used to attenuate the response of an encoder. If a vibration disturbance is of a high amplitude and/or if processing conditions result in a resonant condition, the encoder can lose its position. Excessive vibration can also damage the internal electronic components of the encoder.

The vibration problem occurs on rotary axis heads which are used in machining operations. When using long slender tools, a vibration can be created which causes the encoder to lose its position.

Encoders by their nature should not be isolated from the axis which they are controlling since to do so would potentially result in a loss of position indicating accuracy. The device relies on the use of a tuned damped absorber in a unique configuration for its operation. The device exhibits a significant attenuation of unwanted vibrations that are both lateral and torsional. The improved response eliminates the lost axis position situation and improves the reliability and life of the encoder.

In one application, the mounting of the encoder on a fairly slender beam exacerbates the problem of resonant vibration. The damper device addresses the vibration exhibited at the encoder under both an unbalanced response and during cutting operations. One embodiment addresses torsional response, another addresses the lateral response of the beam to which the rotating part of the encoder is mounted.

It is believed that tool vibration is exciting the encoder during chatter and causing mechanical noise on the encoder output signals. If the vibration that normally affects the encoder can be attenuated by a damper without affecting other aspects of velocity loop bandwidth, the damper should eliminate the problem.

The vibration problem has appeared typically in cutting applications of aluminum at a fairly high speed and is often more prevalent when the cut results in tool chatter. In one application, a long slender tool is used with resulting chatter that is approximately equal to the torsional mode of the input shaft of the encoder. The chatter has been known to cause the rotary axis of the encoder to drift, thus giving an incorrect reading.

When chatter occurs, the A-axis position of the encoder drifts. Vibration of the input shaft of the encoder is the likely root cause of the drift. It is believed that the chatter frequency is in the 1000 to 2000 Hz region for tool modes.

DETAILED DESCRIPTION OF THE DEVICE

Figure 1:
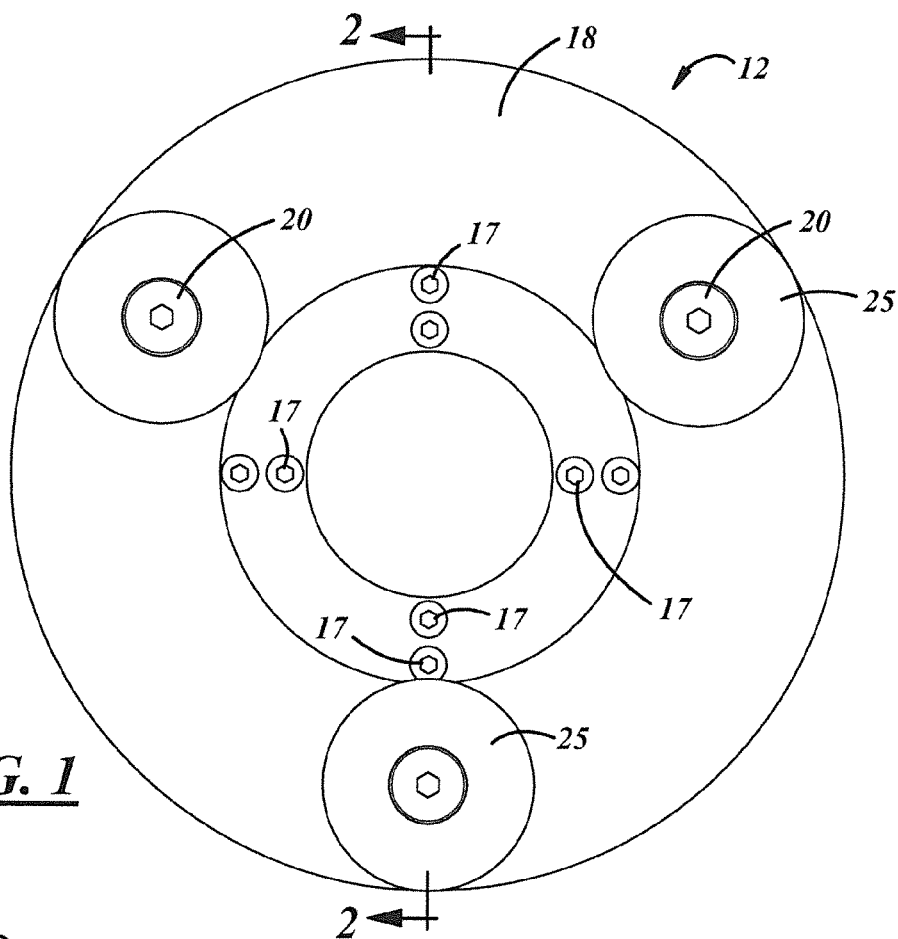
FIG. 1 shows an end view of an absorber for a rotary encoder that damps torsional vibrations.
Figure 2:
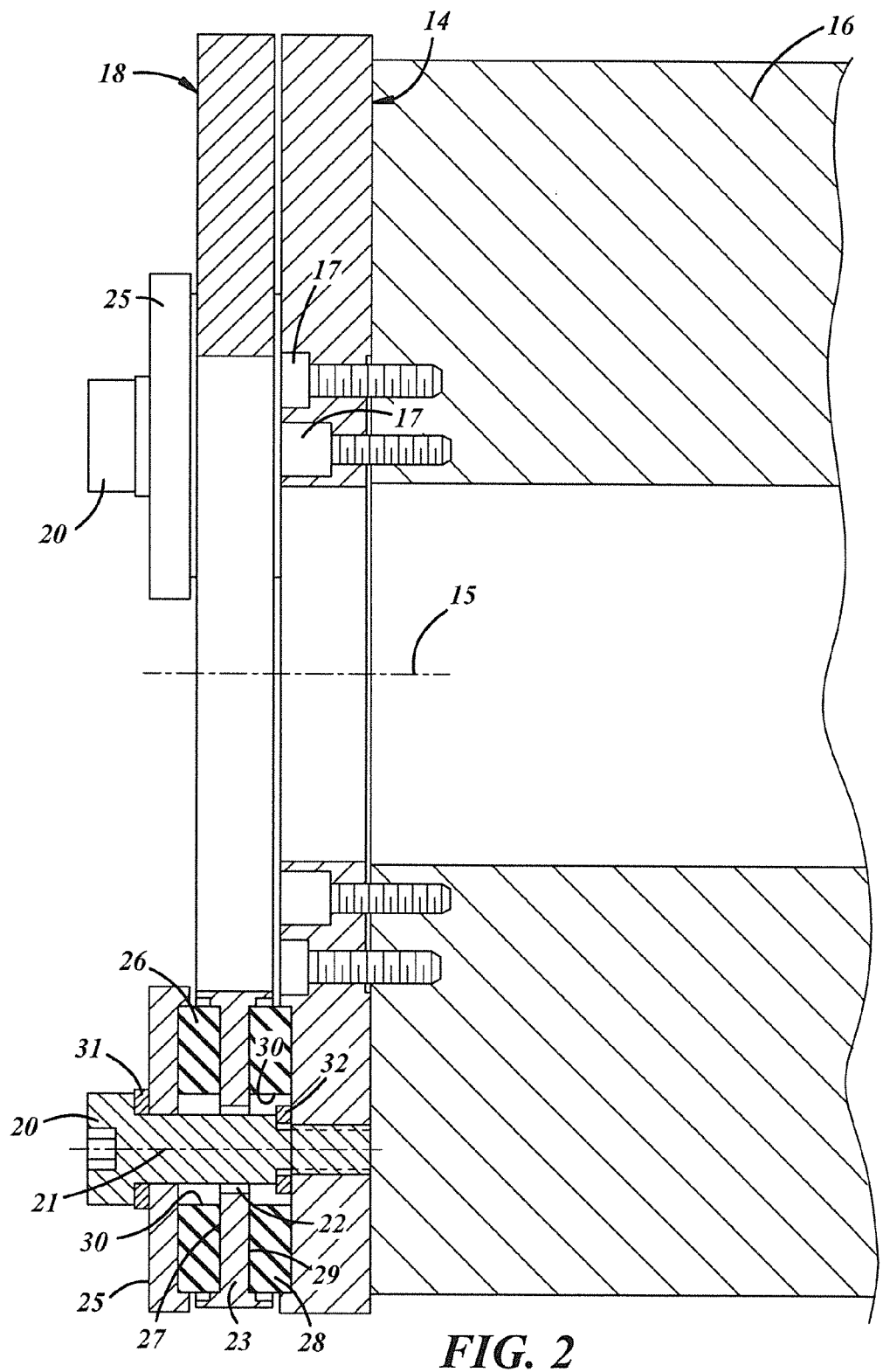
FIG. 2 is a sectional view taken along line 2-2 of FIG. 1.

FIGS. 1 and 2 show an end view and a sectional view, respectively, of an absorber 12 for a rotary encoder that damps torsional vibrations. A mounting plate 14 is mounted on the end of the scale post or input shaft 16 of a rotary encoder by a plurality of bolts 17. The input shaft 16 has a central axis 15. A torsional mass plate 18 is coupled to the mounting plate 14 by a plurality of fastening elements such as shoulder bolts 20.

As best seen in FIG. 2, a washer 25 is used on the end of each of the shoulder bolts 20, and the washer presses against a first outer resilient element such as a resilient donut 26 that presses against the outer side 27 of the mounting flange 23. A second inner resilient element such as a resilient donut 28.

Figure 3:
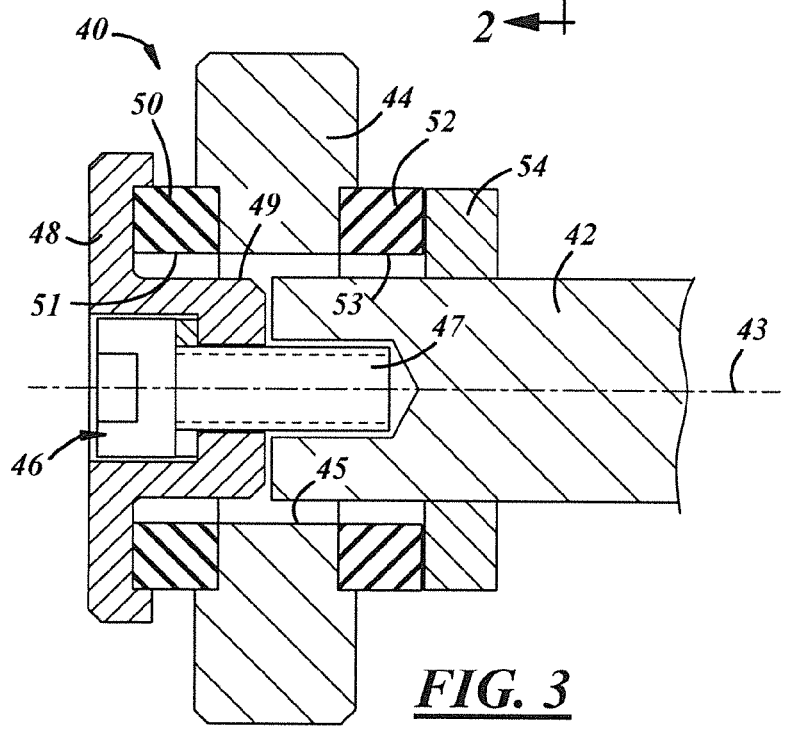
FIG. 3 is a side view of an absorber for a rotary encoder that damps lateral vibrations.

FIG. 3 is a side view of an absorber 40 for a rotary encoder that damps lateral vibrations. The absorber 40 is mounted on the end of the input shaft 42 of a rotary encoder having a center axis 43. The absorber 40 comprises a ring shaped mass element 44 which is attached to the end of the input shaft 42 by a fastening element such as bolt 46 and a retaining washer 48.

Through the use of the damper devices described above, the susceptibility of the A-axis scale of a rotary encoder to induced torsional and lateral vibrations is significantly reduced. Also, because torsional and lateral vibrations are significantly reduced, excessive velocity alarms are completely eliminated or greatly reduced during encoder operation.

I claim:

1. A tuned damper for an input shaft on a rotary encoder, the damper comprising:

a mounting plate coupled to the input shaft of the encoder;

a mass plate coupled to the mounting plate;

a plurality of mounting flanges formed on the mass plate;

a mounting aperture formed in each mounting flange;

a plurality of fastening elements coupling the mass plate to the mounting plate;

first and second resilient elements on either side of each mounting flange, the first and second resilient elements comprising resilient donuts having a central aperture;

the second resilient element positioned between the mounting flange and the mounting plate and separating the mounting flange from direct contact with the mounting plate;

whereby the fastening elements pass through the central apertures in the first and second resilient elements and through the mounting aperture formed in the mounting flanges;

whereby the diameter of the fastening elements is smaller than the diameter of the mounting apertures in the mounting flanges and the inner diameter of the central apertures in the first and second resilient elements so that the body of the fastening elements does not touch the body of either the first or second resilient elements or the mounting flange and the mass plate does not directly contact the mounting plate to isolate the mass plate from the mounting plate, and whereby the mass plate dampens torsional vibration which may exist in the input shaft of the encoder.

2. The tuned damper of claim 1 further comprising:

the plurality of fastening elements comprising a plurality of bolts; and, a washer on the end of each of the bolts for pressing against each of the first resilient elements, whereby the first resilient elements prevent direct contact between the washer and the mounting flange.

3. The tuned damper of claim 2 further comprising:
three bolts comprising the plurality of fastening elements, the three bolts being spaced equally from one another around the axis of the input shaft.

* * * * *